United States Patent [19]

Moxham

[11] Patent Number: 4,704,990
[45] Date of Patent: Nov. 10, 1987

[54] CULTIVATING MOLLUSCS

[76] Inventor: Wayne R. Moxham, 23 Brooklyn Road, Brooklyn, New South Wales 2253, Australia

[21] Appl. No.: 824,345

[22] Filed: Jan. 23, 1986

[30] Foreign Application Priority Data

Jan. 30, 1985 [AU] Australia .............................. PG9075

[51] Int. Cl.⁴ ............................................ A01K 61/00
[52] U.S. Cl. ............................................ 119/4; 119/2
[58] Field of Search .................................... 119/4, 2, 3

[56] References Cited

U.S. PATENT DOCUMENTS

| | | | |
|---|---|---|---|
| 2,989,945 | 6/1961 | Ford ........................................ | 119/4 |
| 3,495,573 | 4/1968 | Vanderborgh, Jr. et al. ......... | 119/4 |
| 3,650,244 | 3/1972 | Fordham ............................... | 119/4 |
| 3,766,888 | 10/1973 | Wiegardt, Jr. ........................ | 119/4 |
| 3,909,971 | 10/1975 | Wilde .................................... | 119/4 |
| 3,996,894 | 12/1976 | Wiegardt, Jr. ........................ | 119/4 |
| 4,080,929 | 3/1978 | Millnitz ................................. | 119/3 |
| 4,170,197 | 10/1079 | Walker .................................. | 119/4 |
| 4,328,764 | 5/1982 | Nickel ................................... | 119/4 |
| 4,377,987 | 3/1983 | Satre ..................................... | 119/4 |
| 4,395,970 | 8/1983 | Kunkle et al. ........................ | 119/4 |

FOREIGN PATENT DOCUMENTS

| | | |
|---|---|---|
| 82/03532 | 10/1982 | PCT Int'l Appl. .................... 119/2 |
| 2040652 | 2/1979 | United Kingdom . |
| 2031251 | 9/1979 | United Kingdom . |
| 2044591 | 2/1980 | United Kingdom . |

Primary Examiner—Robert P. Swiatek
Assistant Examiner—John Weiss
Attorney, Agent, or Firm—Jones, Tullar & Cooper

[57] ABSTRACT

The invention relates to a method and apparatus for cultivating molluscs particularly oysters. Oysters are placed in a water permeable container which is placed in suitable water to feed the oysters. The container is rotated so the oysters are regularly moved in the container. Rotation is caused by mechanical or tidal movement of the water.

18 Claims, 11 Drawing Figures

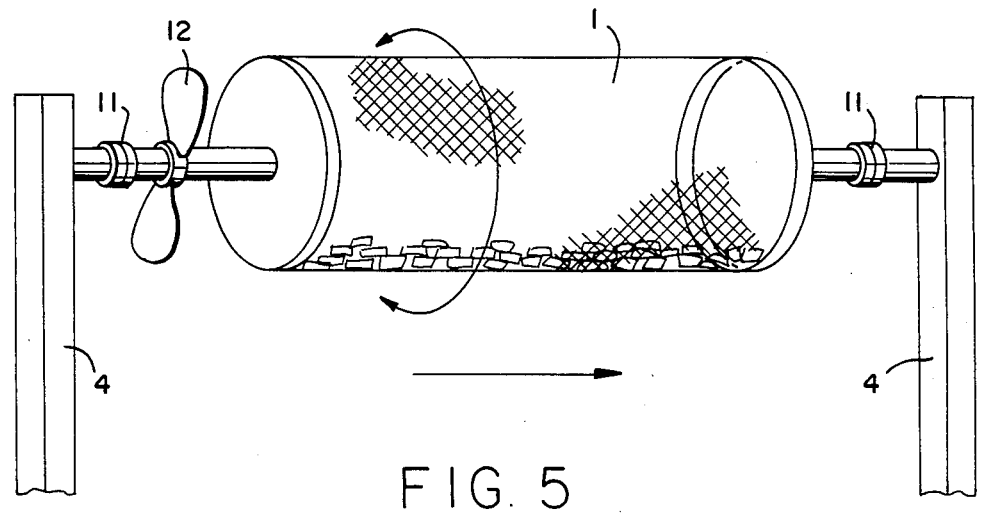
FIG. 5
FIG. 6
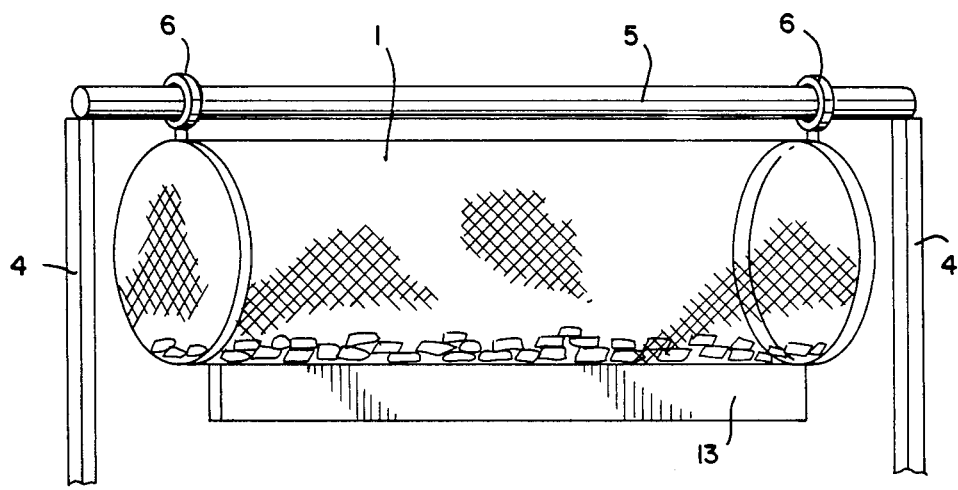
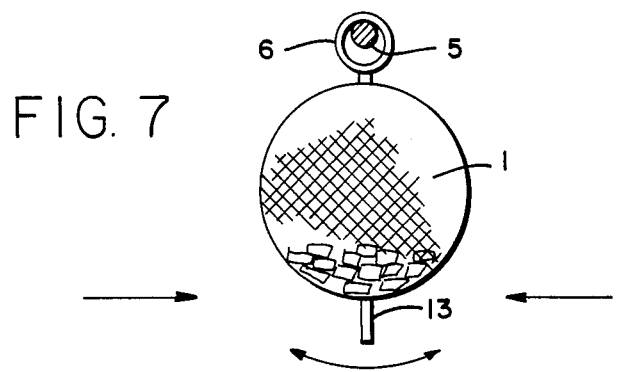
FIG. 7

CULTIVATING MOLLUSCS

This invention relates to a method and apparatus for cultivating molluscs particularly oysters.

Presently known methods and apparatus for cultivating molluscs suffer from the following disadvantages.

When allowed to attach themselves freely to support structures such as stakes they attach to one another in clumps. This results in mis-shapen shells which are difficult to classify and open and extra labour is required to break up the clumps. Also, the shells underneath are not able to feed properly and hence do not develop normally.

Tidal estuaries provide an excellent environment for growing oysters. However, such an environment deposits silt or mud on the shells. The mud not only reduces the feeding rate of the oysters and so slows their growth but also harbours mud worm and other diseases which can destroy the oyster.

The shells of young oysters are relatively soft and can be opened easily by fish which eat the oyster inside. Enormous wastage, up to 80 percent can be caused by fish.

It is an object of this invention to overcome one or more of the above-mentioned disadvantages.

The invention in one broad form includes the method of cultivating molluscs, comprising the steps of placing young molluscs in a water-permeable container, supporting the container in mollusc-feeding water and regularly moving or agitating the container to move the molluscs therein.

The invention in another broad form comprises a water-permeable container adapted to hold a number of molluscs, said container being adapted to be supported in mollusc-feeding water, said container having means causing it to be agitated to move any molluscs therein.

The invention will now be described with reference to the accompanying drawings in which.

Figure 2:
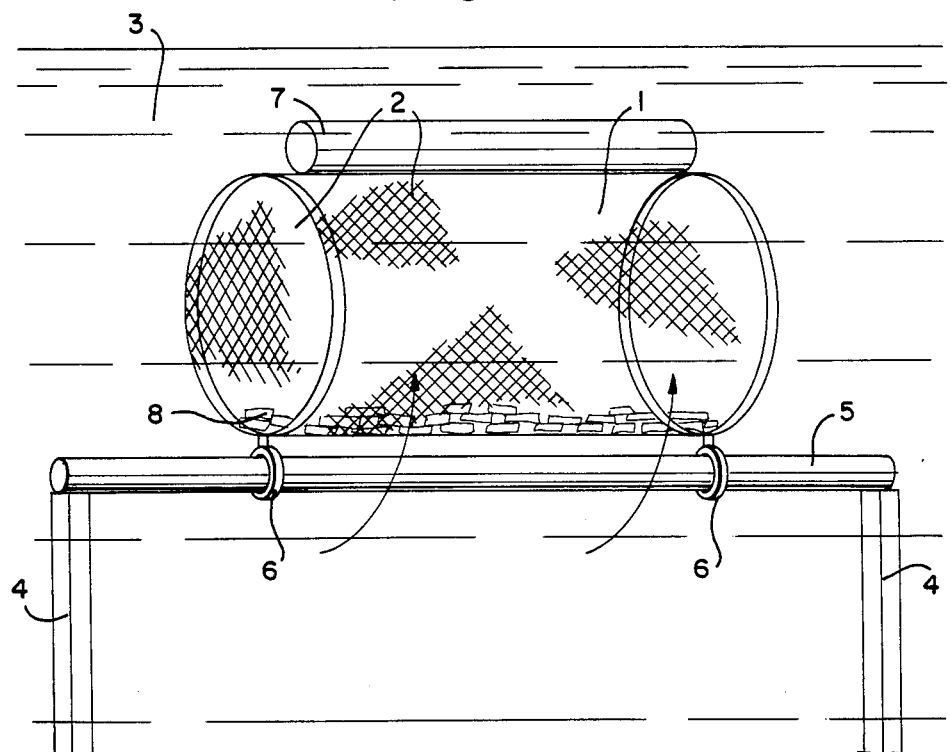
FIG. 2 shows the same container submerged at a higher tide level.
Figure 2A:
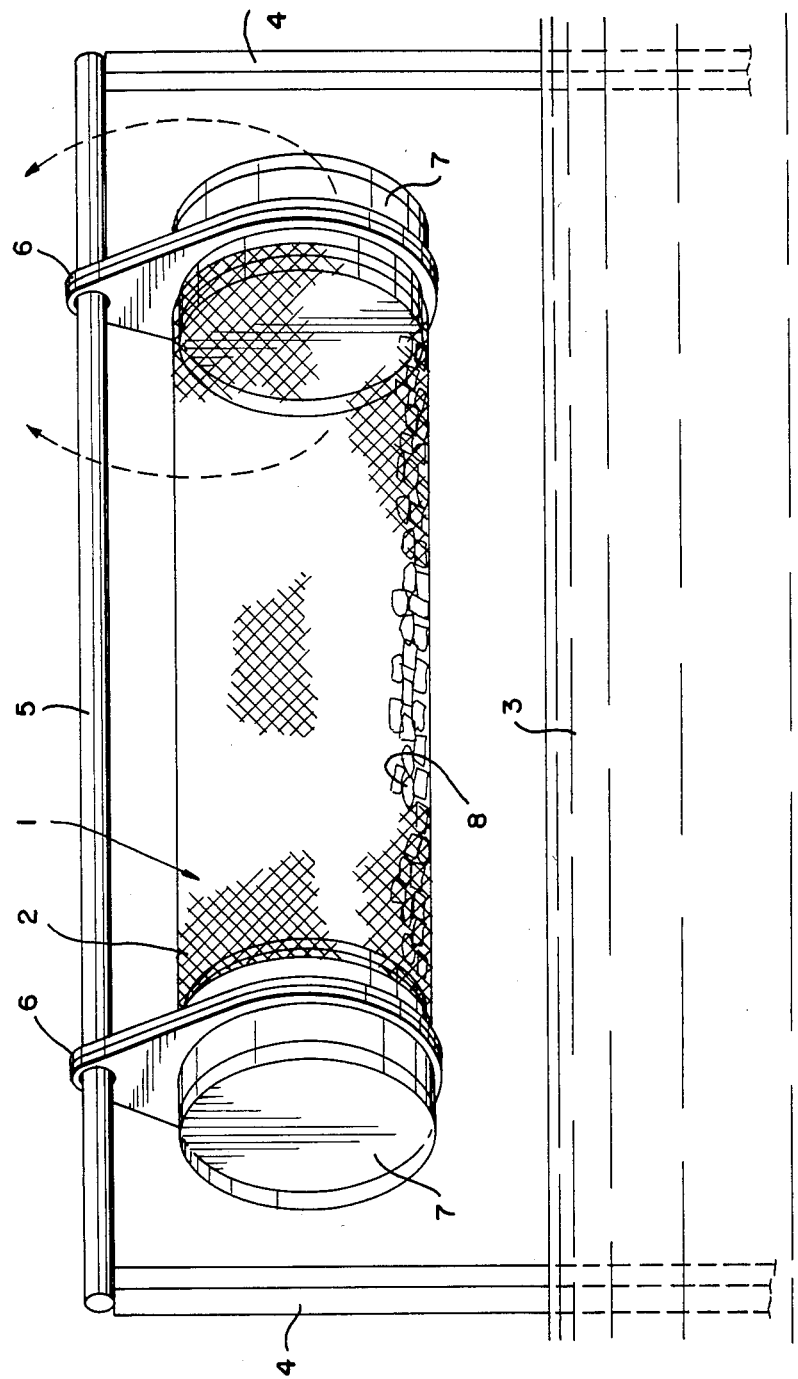
Figure 3:
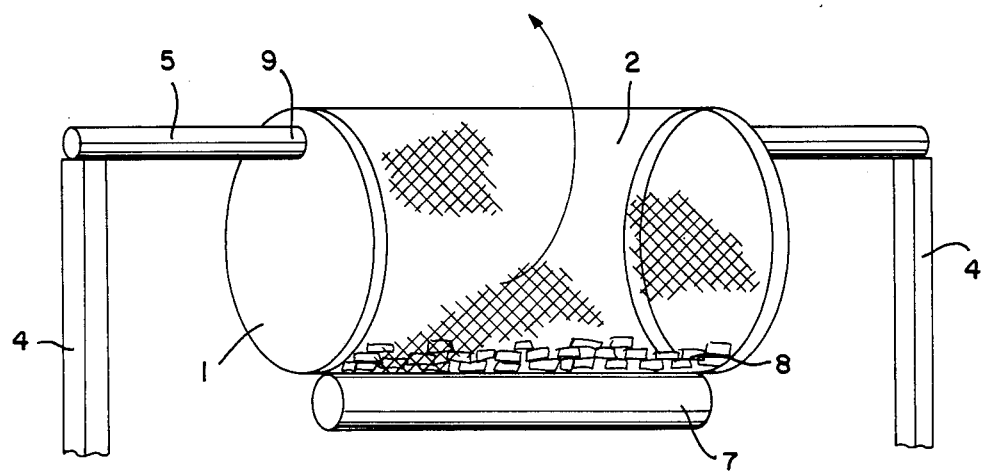
Figure 4:
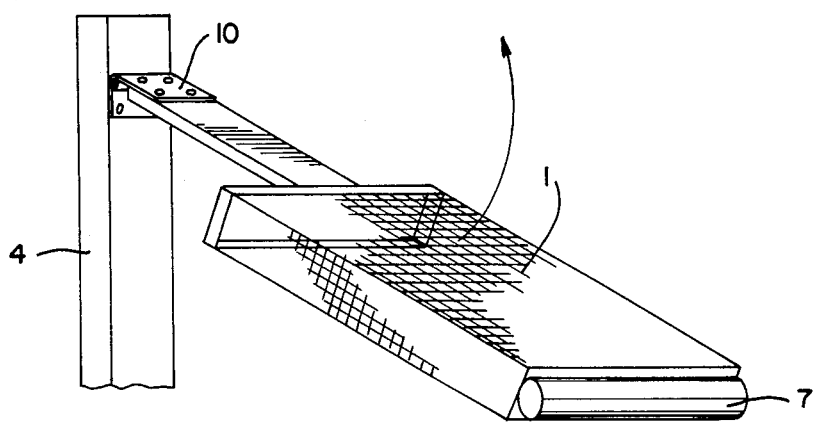
Figure 8:
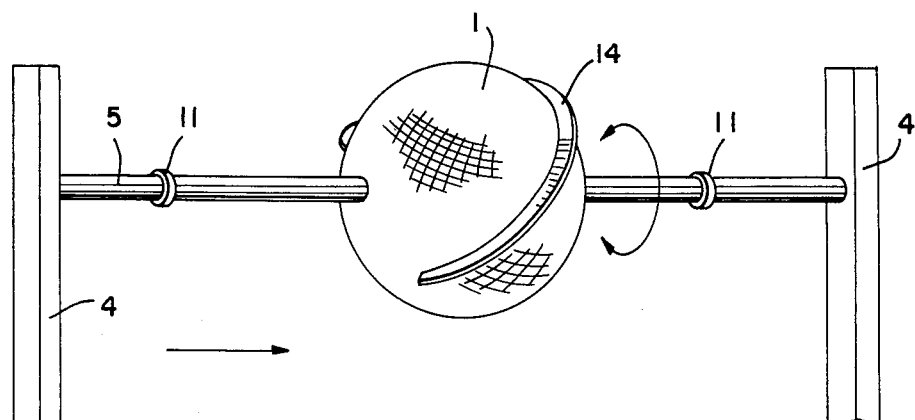
Figure 9:
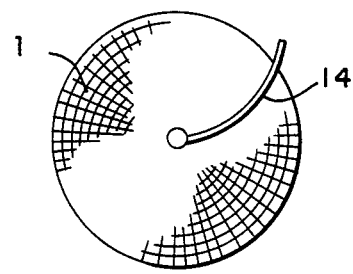

FIG. 2A shoes a similar container with different floatation;

FIG. 3 shows a similar container;

FIG. 4 shows another method of obtaining agitation;

FIG. 5 shows another method of agitation;

FIGS. 6 and 7 show another method of agitation;

FIGS. 8 and 9 show another method of agitation and

Figure 10:
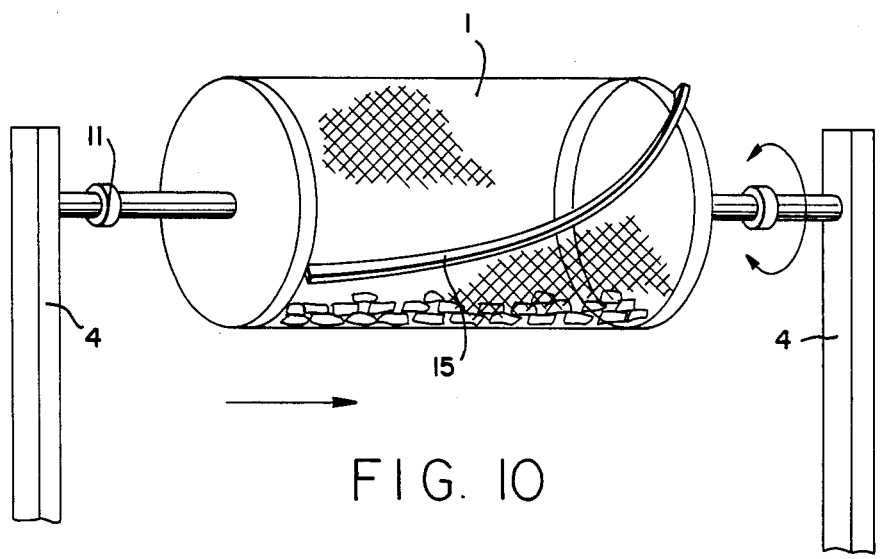

FIG. 10 shows another method of agitation.

Figure 1:
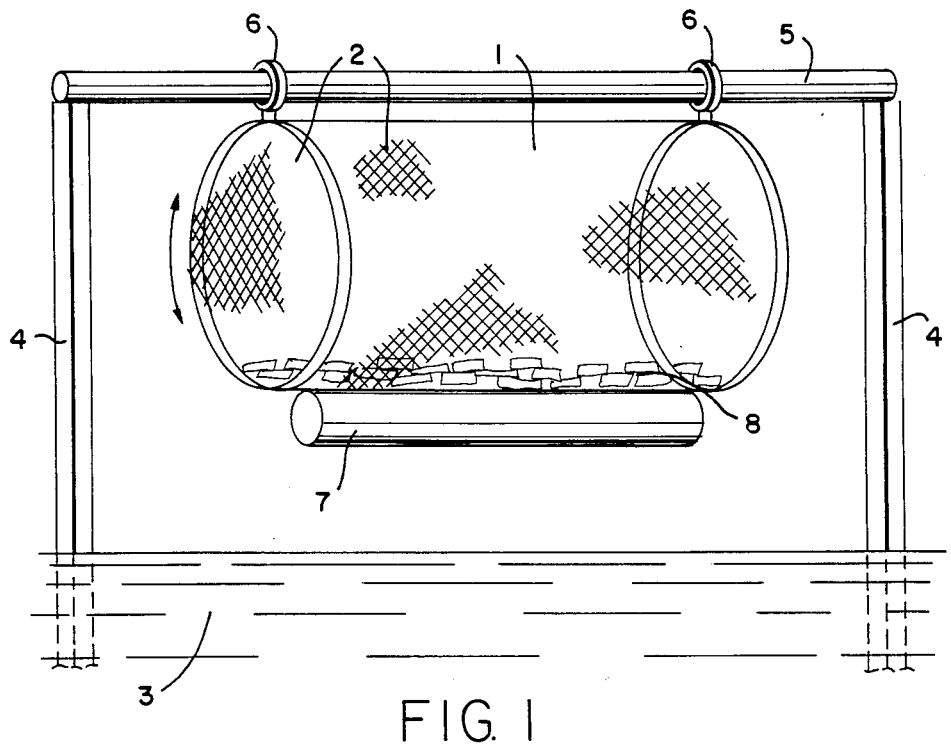
FIG. 1 shows one form of the container supported above the tide level.

Referring to FIGS. 1 and 2 the container 1 has gauze or mesh walls 2. The container 1 is supported above or in the water 3 by posts 4 and cross-bar 5. The container 1 is rotatably attached by loops 6 to the cross-bar 5. A buoyant member 7 is attached to the container, preferably opposite the loops 6. The buoyant member 7 may be integral with the end wall 2a of the container 1 as shown in FIG. 2A.

The height of the posts 4 and hence the level of the container 1 may be adjusted so that as the water level recedes as the tide falls the container 1 is out of the water 3 as in FIG. 1. As the tide rises the container 1 becomes partly or completely submerged as in FIG. 2. As the tide rises and falls the container 1 is slowly rotated up and down about the cross-bar 5 and loops 6 by the action of the buoyant member 7.

The rotation of the container 1 causes a regular tumbling action on the molluscs 8.

FIG. 3 has similar reference numerals to FIGS. 1 and 2. It has a different rotation means as at 9.

FIG. 4 shows a container 1 capable of being moved up and down with the tide by the action of the float 7 about a hinged joint 10 to a post 4.

In FIG. 5 the container 1 is rotatably attached at 11 to the posts 4. A propellor or the like 12 rotates the container 1 by the action of both the in-coming and out-going tide.

FIGS. 6 and 7 show a similar container to FIGS. 1 and 2 but the agitation is caused by the in-coming and out-going tide acting on the vane 13.

FIGS. 8 and 9 show a similar arrangment of FIG. 5 but the rotation is caused by the action of the tide on vane 14.

FIG. 10 shows a similar arrangment to FIGS. 8 and 9 but the container 1 has a different shape and different vane 15.

It is essential to the inventive concept that the molluscs are moved regularly in the water. This is preferably done by agitation of the container, producing a slow tumbling of the molluscs that achieves the objects of the invention.

Because the shells are in regular motion they do not attach to each other or to the container walls. Hence they are not mis-shapen and because the molluscs have greater access to the mollusc-feeding water they grow more quickly.

As the molluscs are tumbled in the surrounding water mud and silt is dislodged from them. This also improved their ability to feed and further increases their growing rate.

The term water-permeable container means a hollow container, preferably cylindrical in shape with at least some of its walls (preferably the cylindrical wall) made of gauze or mesh through which the water may pass. The hole size of the mesh would usually be a compromise between the free flow of water through the container and the mollusc size and age so that fish are prevented from attacking the shells.

While the invention has been described with reference to a natural tidal situation, it is equally suited to artificial cultivation methods and arrangements. The water level in a growing tank could be raised and lowered so the container 1 would be rotated by the action of the float 7.

Also, water could be moved through a tank so the arrangements of FIGS. 5 to 10 would work.

It is envisaged that a container such as 1 could be fixed in a tank of water and the mollusc movement is caused by fluctuating natural or mechanical current flow or by ordinary mechanical rotation.

The method of the invention envisages using apparatus described above for the cultivation of molluscs. The term "rotation" does not necessarily mean full revolutions.

From the foregoing description which is only exemplary of the invention it is apparent that uniformly well-shaped quick-growing disease-free molluscs can be produced.

What I claim is:
1. Apparatus for growing molluscs, comprising:
    a water-permeable container for holding a number of molluscs for cultivation in mollusc-feeding water;

means for attaching said container to supports so the container is rotatably supported in the mollusc-feeding water; and means responsive to regular movement of the mollusc-feeding water to give the container a rotational movement to thereby regularly tumble the molluscs in the container.

2. Apparatus as claimed in claim 1, wherein said means responsive to movement of the water is bouyant means connected to said container, whereby changes in the level of the water produce rotational movement of the container.

3. Apparatus as claimed in claim 1, wherein said means responsive to movement of the water is at least one vane connected to said container, whereby current flow of the water produces rotational movement of the container.

4. Apparatus as claimed in claim 1, wherein the movement of the water is both a level change and current flow caused by natural tidal movement.

5. Apparatus as claimed in claim 1, wherein the movement of the water is mechanically generated.

6. Apparatus as claimed in claim 2, wherein the movement of the water is both a level change and current flow caused by natural tidal movement.

7. Apparatus as claimed in claim 2, wherein the movement of the water is mechanically generated.

8. Apparatus as claimed in claim 3, wherein the level change and the current flow are caused by natural tidal movement.

9. Apparatus as claimed in claim 3, wherein the movement of the water is mechanically generated.

10. Apparatus as claimed in claim 1, further including stationary support means for said container, and wherein said means for attaching said container to supports includes means for attaching said container to said support means, whereby movement of the water imparts said rotational movement to said container.

11. Apparatus as claimed in claim 10, wherein said means responsive to movement of the water includes means attached to said container for pivoting said container about said support means in response to changes in the level of the water.

12. Apparatus as claimed in claim 10, wherein said means responsive to movement of the water includes means attached to said container for pivoting said container about said support means in response to changes in the current flow of the water.

13. Apparatus as claimed in claim 10, wherein said container includes first and second spaced end walls, and wherein said means responsive to movement of the water includes first and second bouyant elements integral with said first and second end walls, respectively.

14. Apparatus as claimed in claim 13, wherein said stationary support means includes a horizontal bar, and wherein said container is attached to said bar by means of first and second spaced loops attached to, and extending outwardly from, said container, whereby said container pivots about said bar in response to changes in the level of the water.

15. A method of growing molluscs, comprising the steps of:

placing young molluscs in a water-permeable container;

rotatably supporting the container in a regularly moving mollusc-feeding water; and at least partially rotating the container by action of the moving water on the container to regularly tumble the molluscs within the container.

16. A method of growing molluscs as claimed in claim 15, wherein the step of rotatably supporting the container includes supporting one side of the container a fixed level and wherein the step of at last partially rotating the container includes providing bouyant means on the container responsive to water level changes to pivot the container about said fixed level.

17. A method of growing molluscs as claimed in claim 15, wherein the step of at least partially rotating the container includes securing at last one vane on the container to respond to water current movement.

18. A method of growing molluscs as claimed in claim 15, wherein the step of at least partially rotating the container includes securing at least one bouyant means to the container to respond to changes in water level.

* * * * *